US012440051B2

(12) United States Patent
Huo et al.

(10) Patent No.: US 12,440,051 B2
(45) Date of Patent: Oct. 14, 2025

(54) FOOD ARTICLE

(71) Applicant: Conopco Inc., Englewood Cliffs, NJ (US)

(72) Inventors: Zhe Huo, Shanghai (CN); Yan Liang, Shanghai (CN); Ao Shu, Shanghai (CN); Anna Wong, Shanghai (CN); Houyu Xie, Shanghai (CN); Tanja Grudke-Katschus, Heilbronn (DE); Anja Kunkel, Heilbronn (DE); Regine Weimar, Heilbronn (DE)

(73) Assignee: Conopco Inc., Englewoods Cliffs, NJ (US)

( * ) Notice: Subject to any disclaimer, the term of this patent is extended or adjusted under 35 U.S.C. 154(b) by 895 days.

(21) Appl. No.: 17/414,978

(22) PCT Filed: Dec. 13, 2019

(86) PCT No.: PCT/EP2019/085185
§ 371 (c)(1),
(2) Date: Jun. 17, 2021

(87) PCT Pub. No.: WO2020/126940
PCT Pub. Date: Jun. 25, 2020

(65) Prior Publication Data
US 2022/0061563 A1    Mar. 3, 2022

(30) Foreign Application Priority Data

Dec. 20, 2018 (EP) .................................. 18214412
May 28, 2019 (WO) ............... PCT/CN2019/088783
May 28, 2019 (WO) ............... PCT/CN2019/088784
Jun. 25, 2019 (EP) .................................. 19182192

(51) Int. Cl.
*A47G 21/00* (2006.01)
*A21D 13/48* (2017.01)
*A47G 21/06* (2006.01)

(52) U.S. Cl.
CPC ........... *A47G 21/004* (2013.01); *A21D 13/48* (2017.01); *A47G 21/103* (2013.01); *A47G 2400/105* (2013.01)

(58) Field of Classification Search
CPC ....... A21D 13/14; A21D 13/48; A47G 21/004
See application file for complete search history.

(56) References Cited

U.S. PATENT DOCUMENTS

| 2,278,466 | A | 4/1942 | Musher |
| 2,954,296 | A | 9/1960 | Clausi et al. |
| 3,154,418 | A | 10/1964 | Bell et al. |
| 3,312,555 | A | 4/1967 | Rainero et al. |
| 3,336,139 | A | 8/1967 | Groncki et al. |
| 3,360,121 | A | 12/1967 | Lazuer et al. |
| 3,373,042 | A | 3/1968 | Elerath et al. |
| 3,386,837 | A | 6/1968 | Alfred et al. |
| 3,493,382 | A | 2/1970 | Burns et al. |
| 3,637,398 | A | 1/1972 | Elerath |
| 3,804,960 | A | 4/1974 | Barnett et al. |
| 3,869,555 | A | 3/1975 | Heonis |
| 4,025,657 | A | 5/1977 | Cheng et al. |
| 4,178,392 | A | 12/1979 | Gobble et al. |
| 4,225,627 | A | 9/1980 | Moore |
| 4,578,274 | A | 3/1986 | Sugisawa et al. |
| 5,589,214 | A | 12/1996 | Palm |
| 5,863,583 | A | 1/1999 | Altschul |
| 6,001,408 | A | 12/1999 | Dudacek et al. |
| 6,017,388 | A | 1/2000 | Yuan |
| 7,208,188 | B2 | 4/2007 | Sakuma et al. |
| 7,794,771 | B2 * | 9/2010 | Kessler .................. A23F 5/385 |
|  |  |  | 426/414 |
| 11,291,226 | B1 | 4/2022 | Shah et al. |
| 2003/0033939 | A1 | 2/2003 | Mahe et al. |
| 2006/0233924 | A1 | 10/2006 | Nguyen |
| 2007/0054020 | A1 | 3/2007 | Kumagai |
| 2007/0134397 | A1 | 6/2007 | Eppler et al. |
| 2008/0113068 | A1 | 5/2008 | Grimshaw |
| 2008/0166459 | A1 | 7/2008 | Achterkamp et al. |
| 2008/0299268 | A1 | 12/2008 | Achterkamp et al. |
| 2010/0028496 | A1 | 2/2010 | Barnekow et al. |
| 2010/0143550 | A1 | 6/2010 | Abdel-Fattah |
| 2010/0196584 | A1 | 8/2010 | Desjardins et al. |
| 2011/0027429 | A1 | 2/2011 | Kogane |
| 2012/0276271 | A1 | 11/2012 | Inoue et al. |
| 2013/0309385 | A1 | 11/2013 | Perrin et al. |

(Continued)

FOREIGN PATENT DOCUMENTS

CA        964074      3/1975
CN      1343099 A     4/2002
(Continued)

OTHER PUBLICATIONS

Rahman et al., "Chapter 26—Food Preservation by Freezing" in Handbook of Food Preservation, Second Edition, M.S. Rahman Ed., CRC Press, (2007), pp. 636-657. (Year: 2007).*
Lewis et al., "Chapter 2—Thermal Processing", in Food Processing Handbook, Second Edition, Brennan, J. and Grandison, A.S., Ed., Wiley VCH, (2012), pp. 31-76. (Year: 2012).*
Anonymous; RTE FD SOUP process primary study; RTE FD SOUP process primary study; Feb. 14, 2019; Unilever Foods.
Miyazaki et al.: Recent advances in application of modified starches for breadmaking, Trends in Food Science & Technology, 17 (2006) pp. 591-599.
Tester et al.: Annealing of starch—a review, International Journal of Biological Macromolecules, 27 (2000) pp. 1-12.
(Continued)

*Primary Examiner* — Elizabeth Gwartney
(74) *Attorney, Agent, or Firm* — Ipsilon USA—NLO

(57) ABSTRACT

The present invention relates to a process for producing a food article consisting of an edible composition having an elongated member extending therefrom, the edible composition having a water content of less than 5 wt. %. The present invention also relates an edible composition and to the of the edible composition for preparing a meal or snack.

14 Claims, No Drawings

(56) References Cited

U.S. PATENT DOCUMENTS

| | | |
|---|---|---|
| 2014/0120222 A1 | 5/2014 | Schroeder et al. |
| 2015/0010684 A1 | 1/2015 | Gay |
| 2015/0025158 A1 | 1/2015 | Skorge et al. |
| 2015/0204548 A1 | 7/2015 | Miller |
| 2016/0324207 A1 | 11/2016 | Gearhart |
| 2018/0192683 A1 | 7/2018 | Lane et al. |
| 2020/0178585 A1 | 6/2020 | Mellema et al. |
| 2020/0345047 A1 | 11/2020 | Okada |
| 2021/0030041 A1 | 2/2021 | Gaddipati et al. |
| 2022/0046975 A1 | 2/2022 | Skulec |
| 2022/0061563 A1 | 3/2022 | Huo et al. |
| 2022/0095655 A1 | 3/2022 | Grudke-Katschus et al. |

FOREIGN PATENT DOCUMENTS

| | | |
|---|---|---|
| DE | 2938596 | 5/1982 |
| DE | 3538805 | 5/1987 |
| EP | 0 087 847 A1 | 9/1983 |
| EP | 0512249 | 11/1992 |
| EP | 1166645 | 1/2002 |
| EP | 1214895 A1 | 6/2002 |
| EP | 1216640 | 6/2002 |
| EP | 0910957 | 9/2002 |
| EP | 1241216 | 9/2002 |
| EP | 2509449 | 10/2012 |
| EP | 3123875 | 2/2017 |
| EP | 0026102 | 4/2019 |
| FR | 2661317 | 10/1991 |
| GB | 1019552 | 9/1962 |
| JP | 2005261225 | 9/2005 |
| JP | 2009148254 | 7/2009 |
| JP | 2016111972 | 6/2016 |
| WO | 00/54609 A1 | 9/2000 |
| WO | WO0247519 | 6/2002 |
| WO | WO2004108767 | 12/2004 |
| WO | WO2007007243 | 1/2007 |
| WO | WO2007009600 | 1/2007 |
| WO | WO2011069885 | 6/2011 |
| WO | WO2012083410 | 6/2012 |
| WO | WO2012119765 | 9/2012 |
| WO | WO2016066383 | 5/2016 |
| WO | WO2017021069 | 2/2017 |
| WO | WO2017021073 | 2/2017 |
| WO | WO2017186514 | 2/2017 |
| WO | WO2017032685 | 3/2017 |
| WO | WO2017089174 | 6/2017 |
| WO | WO2017021071 | 9/2017 |
| WO | WO2018108431 | 6/2018 |
| WO | WO2019015932 | 1/2019 |

OTHER PUBLICATIONS

Huang et al., Production Technology and Application of Resistant Starch; 2017; Jan. 31, 2017; 3.

Zhang, Food emulsifier; China Light Industry Press; pp. 592; 1996; Aug. 30, 1996; 2.

Zhao, Principles of Food Technology the 1st Edition; China Light Industry Press; pp. 194; 2002; Jul. 31, 2002; 3.

* cited by examiner

FOOD ARTICLE

FIELD OF THE INVENTION

The present invention relates to a food article, a method of making said composition and to the use of said composition.

TECHNICAL FIELD OF THE INVENTION

The present invention relates to a food article, a method of preparing such an article and to use of such an article to prepare snack or meal.

BACKGROUND OF THE INVENTION

Consumers desire a simple way to prepare snacks and/or meals both at home and outside the home. Outside the home, the consumer experiences several disadvantages when preparing a meal or snack using food articles such as instant soup mixes of the prior art. In the case of powders, the correct amount of powder needs to be added. This can be achieved by portioning the soup mix into single-servings or adding a measured amount by e.g. a spoon from tub. However, a tub of soup mix is not ideal as it is cumbersome and does not lend itself to easily preparing a savoury meal on-the-go.

The consumer also wants to use snack/meal mixes that look appealing and are perceived as clean label.

Attempts have been made to overcome some of these disadvantages. For example, GB 1 019 552 describes a packaging system in the form of a spoon in which a concentrated product is arranged in the bowl of the spoon and is covered and held in place by a heat-sensitive film. Upon contact with hot water, the plastic film becomes partially or completely detached to release the soluble concentrated product.

Such a system is not ideal because a shred of plastic remains secured to the spoon or remains in the beverage, and this considerably hampers the use of the spoon or consumption of the beverage reconstituted in this way.

WO0247519 describes a method for manufacturing an assembly comprising a utensil comprising the following steps:
heating 25 to 40 parts of fat until they melt,
adding 5 to 50 parts of binder and 20 to 70 parts of flavourings,
homogenizing so as to obtain a pourable mixture,
pouring into a mould,
partially inserting a utensil for holding or stirring the mixture before it solidifies,
cooling the assembly until the mixture solidifies,
removing the assembly from the mould.

Besides rich, fat based soups such as those of WO0247519, broth based soups are popular with consumers. Broth based soups are known to be made by freeze drying a broth, e.g. miso soup. US20070054020A1 discloses in Example 1a freeze dried miso soup made by a process in which a miso soup is filled in moulded container, then placed in a freezer of −25° C. and let to stand for 5 hours to be chilled and solidified.

The processes of the prior art are not amenable to high throughput production due to the long maturation time for fat based food articles or the long freezing time of freeze-dried based food articles.

There is a need to provide a process for the preparation of food articles that is amenable to rapid, large scale production.

There is also a need to provide a process for the preparation of food articles that are visually appealing, easy to handle and dissolve quickly for a tasty and instant snack.

It is an object of the present invention to provide an efficient process for the preparation of food articles that is amenable to high throughput production.

It is a further object of the present invention to provide food articles that are visually appealing, easy to handle and dissolve quickly for a tasty and instant snack.

SUMMARY OF THE INVENTION

The inventors of the present invention have developed a process for the preparation of a food article consisting of an edible composition having an elongate member extending therefrom as described herein. Inclusion of the elongate member makes the food articles visually appealing and easy to handle. The process of the present invention is particularly suitable to high throughput production. Advantageously, the edible composition according to the invention dissolves quickly.

In a first aspect, the invention provides a process for producing a food article consisting of an edible composition having an elongated member extending therefrom, the edible composition having a water content of less than 5 wt. %, by weight of the edible composition, said process comprising the steps of:
a) providing a mixture of edible ingredients comprising,
i) edible crystalline material selected from sodium chloride, potassium chloride, sucrose and combinations thereof;
ii) plant matter selected from vegetables, fruit, herbs, spices and combinations thereof,
iii) water,
b) preparing a cooled mixture of edible ingredients by:
i) cooling and agitating the mixture of edible ingredients to provide a cooled, mixture having a temperature of −20 to 5° C., preferably −15 to 0° C., and ii) positioning an elongate member in the cooled mixture, or
ii) filling a mould with the mixture of edible ingredients and providing the mould with an elongate member, and contacting the mould with a liquid or gaseous refrigerant to provide a frozen mixture,
c) freeze-drying the cooled mixture having an elongate member extending therefrom to obtain a savoury food article.

The word 'comprising' as used herein is intended to mean 'including' but not necessarily 'consisting of' or 'composed of'. In other words, the listed steps or options need not be exhaustive.

Unless specified otherwise, numerical ranges expressed in the format 'from x to y' or 'x-y' are understood to include x and y. When for a specific feature multiple preferred ranges are described in the format 'from x to y' or 'x-y', it is understood that all ranges combining the different endpoints are also contemplated. For the purpose of the invention ambient temperature is defined as a temperature of about 20° C.

The term "solid" as used herein means a material consisting of a network of particles that together form a shape retaining material. The term "solid" as used herein may be porous.

The term "particulate" as used herein in relation to a material, refers to a savoury composition that consists of discrete particles, preferably discrete particles having an average particle size of at least 10 μm. Particle size distributions of particulate components can suitably be determined with a set of sieves of different mesh sizes. The average particle size as referred to herein is the volume weighted average particle size that can be measured by the skilled person using conventional methods, for example by sieve analysis.

The term "elongate member" as used herein means an object made of a solid material, for example wood, plastic or metal, or an edible material such as starch, having at least two ends, wherein a first end is in contact with the savoury composition and a second end allows holding and/or stirring by the user.

The term "freeze-drying" as used herein means removing solid water (i.e., ice) from a frozen composition by converting it directly into water vapor, skipping the liquid phase, i.e. via sublimation. The sublimation process is normally carried out in a vacuum chamber wherein the pressure is reduced to below the triple point of water. Heat is introduced to the frozen extract at a controlled rate in order to supply the heat of sublimation while preventing the frozen extract from reaching a temperature at which it would melt.

The terms 'fat' or 'oil' are used interchangeably, unless specified otherwise. The terms 'fat' and 'oil' as used herein refers to glycerides selected from triglycerides, diglycerides, monoglycerides, phosphoglycerides, free fatty acids and combinations thereof. Where applicable the prefix 'liquid' or 'solid' is added to indicate whether the fat or oil is liquid or solid at 20° C.

The solid fat content of the fat blend can suitably be determined using the method described in *Animal and vegetable fats and oils—Determination of solid fat content by pulsed NMR—Part 1: Direct method*—ISO 8292-1:2008.

The term "solid fat component" as used herein refers to fat that has a solid component at 20° C.

The term "liquid oil" as used herein refers to fat that is liquid at 20° C.

The term "particulate" as used herein in relation to a material, refers to a material that consists of discrete particles, preferably discrete particles having a particle size of at least 10 μm. Particle size distributions of particulate components can suitably be determined with a set of sieves of different mesh sizes.

Process

The present invention provides a process for producing a food article consisting of an edible composition having a water content of less than 5 wt. %. Preferably, the water content is less than 4 wt. %, more preferably less than 3 wt. %, even more preferably less than 2.5 wt. %. The water content may be determined by standard methods, for example DIN 10236:2001-12, PV01441, graviometry.

The food composition preferably has a water activity of less than 0.55. Preferably, the savoury concentrate has a water activity in the range of 0.20 to 0.55, more preferably in the range of 0.23 to 0.52 and most preferably in the range of 0.25 to 0.50.

Mixture of Edible Ingredients

Step a) of the process of the present invention provides a mixture of edible ingredients comprising:
  i) edible crystalline material selected from sodium chloride, potassium chloride, sucrose and combinations thereof;
  ii) plant matter selected from vegetables, fruit, herbs, spices and combinations thereof;
  iii) water.

Preferably, the edible crystalline material is selected from the group consisting of sodium chloride, potassium chloride and combinations thereof. In some preferred embodiments, the edible crystalline material is sucrose.

Preferably, the mixture of edible ingredients comprises 0.5-30 wt. %, more preferably 1-20 wt. %, even more preferably 2-15 wt. %, of the edible crystalline material, by weight of the mixture of edible ingredients.

Preferably the edible crystalline material is sodium chloride and/or potassium chloride.

Preferably, the mixture of edible ingredients comprises 0.5-15 wt. %, more preferably 1-10 wt. %, even more preferably 2-5 wt. %, of sodium chloride and/or potassium chloride, by weight of the mixture of edible ingredients.

Preferably, the edible crystalline material comprises, by weight of the edible crystalline material, at least 80 wt. % sodium chloride and/or potassium chloride, more preferably at least 90 wt. %, and at most 10 w. %, preferably at most 5 wt. % sucrose. Preferably, the sodium chloride and/or potassium chloride comprise at least 98 wt. % of said edible crystalline material.

In another preferred embodiment, sucrose represents at least 80 wt. %, more preferably at least 90 wt. % and most preferably at least 98 wt. % of said edible crystalline material.

Preferably, the mixture of edible ingredients comprises 0-30 wt. %, more preferably 0.25-20 wt. %, even more preferably 1-15 wt. %, of sucrose, most preferably 5-10 wt. %, by weight of the mixture of edible ingredients The process according to the present invention is suitable for the preparation of both savoury and sweet soups. Savoury soups commonly contain plant pieces and a balance of edible crystalline materials such as sodium chloride and/or potassium chloride and sucrose. Typically, the mixture of edible ingredients preferably comprises 0.5-15 wt. %, more preferably 1-10 wt. %, even more preferably 2-5 wt. %, of sodium chloride and/or potassium chloride and 0-5 wt. % sucrose, more preferably 0.25-2 wt. % sucrose, by weight of the mixture of edible ingredients.

Sweet soups are popular in Asia and an example is Tremella fuciformis (white fungus) soup. Typically, the mixture of edible ingredients preferably comprises 0.5-15 wt. %, more preferably 1-10 wt. %, even more preferably 2-5 wt. %, of sucrose and 0-5 wt. %, more preferably 0.25-2 wt. % sodium chloride and/or potassium chloride, by weight of the mixture of edible ingredients.

The edible crystalline material which is employed in accordance with the invention preferably has a mass weighted average diameter in the range of 10-2000 μm, more preferably in the range of 100-1200 μm, and most preferably in the range of 200-800 μm.

Typically, at least 80 wt. % of the edible crystalline material has a particle size in the range of 10-2000 μm. Even more preferably at least 80 wt. % of the edible salt has a particle size in the range of 50-1500 μm. Most preferably, at least 80 wt. % of the edible salt has a particle size in the range of 100-1000 μm.

The plant matter is selected from vegetables, fruit, herbs, spices and combinations thereof. Preferably, the plant matter is contained in a solid (at 20° C.), particulate matrix comprising edible crystalline material and plant matter. The plant matter may be vegetable or fruit matter. Preferably the plant matter is vegetable matter, not being limited to powdered, sliced, diced, cubed, macerated, or otherwise comminuted pieces of vegetables.

Preferably, the mixture of ingredients comprises 5-70 wt. % of plant matter selected from herbs, spices, vegetables, fruit and combinations thereof, by weight of the mixture of edible ingredients. Preferably, the composition comprises 10-60 wt. %, even more preferably 15-50 wt. % of the plant material, by weight of the mixture of edible ingredients.

Preferably at least 80 wt. % of said particulate plant material passes a sieve with apertures of 2000 μm.

The mixture of edible ingredients preferably comprises at least 1 wt. %, more preferably at least 10 wt. % and most preferably at least 25 wt. % of plant matter, said plant matter being selected from vegetables, herbs, spices, fruit and combinations thereof, said plant material preferably having a mesh size in the range of 0.2-10 mm.

Typically, the mixture of edible ingredients contains 1 to 60 wt. %, more preferably 2-55 wt. % and most preferably 5-45 wt. %, by weight of the mixture of edible ingredients, of plant matter preferably having a mesh size in the range of 0.2-10 mm.

Examples of plant matter include vegetables, herbs, spices, fruit, nuts, grains, and combinations thereof. Preferably the tissue material is edible material selected from vegetables, herbs, spices and fruit. In a particularly preferred embodiment the fruit is dragon fruit.

The mixture of edible ingredients comprises at least 20 wt. % water. The amount of water relates to the total water present in the mixture of edible ingredients and relates to bound water of the ingredients. Preferably, the mixture of edible ingredients comprises 20-90 wt. %, preferably 30-80 wt. %, more preferably 40-70 wt. % water, by weight of the mixture of edible ingredients.

Preferably, the mixture of edible ingredients comprises 2 to 35 wt. %, by weight of the mixture of edible ingredients, of starch components selected from native starches, wherein the native starch is preferably selected from the group consisting of corn starch, potato starch, tapioca starch, waxy corn starch, waxy rice starch, and wheat starch and combinations thereof. The starch component may, in some preferred embodiments, be provided as a component of the plant matter.

The starch component may preferably comprise native starch. Typically, the native starch is a non-gelatinized starch. Non-gelatinized starch may be a physically modified, enzymatically modified or chemically modified starch.

"Physically modified starch" means a starch which has been subjected to a heat treatment in the presence of relatively small amounts of water or moisture. No other reagents are added to the starch during the heat treatment. The heat-treatment processes include heat-moisture and annealing treatments, both of which cause a physical modification of starch without any gelatinization, damage to granular integrity, or loss of birefringence (Miyazaki et al., Trends in Food Science & Technology 17 (2006) p. 591-599). Annealing represents 'physical modification of starch slurries in water at temperatures below gelatinisation' whereas heat-moisture treatment 'refers to the exposure of starch to higher temperatures at very restricted moisture content (18-27%)'. (Tester et al., International Journal of Biological Macromolecules 27 (2000) p. 1-12). Physical modification should be distinguished from gelatinisation of starch, which usually is carried out by heating starch in an excess amount of water. Other terms which are used for this type of starch are "heat-treated starch" and "heat-modified starch".

"Enzymatically modified starch" means a starch which has been treated with one or more enzymes to modify its properties.

"Chemically modified starch" means a starch which has been reacted with reagents which have been added to the starch in order to form new covalent bonds between those molecules and the starch molecules.

Preferably, the mixture of edible ingredients comprises gelatine. Preferably, the gelatine is present in an amount of 1-20 wt. %, based on the total weight of the mixture of edible ingredients, preferably 2-15 wt. %, more preferably 3-10 wt. %.

The mixture of edible ingredients preferably comprises proteinaceous matter. Suitable proteinaceous matter includes dairy protein and albumin. Preferably, the mixture of edible ingredients comprises 2 to 15 wt. %, preferably 5 to 10 wt. % proteinaceous matter, based on the total weight of the mixture of edible ingredients.

Preferably, the mixture of edible ingredients comprises 1-10 wt. %, of a fat component, preferably 2-7 wt. % of a fat component, even more preferably 2.5-5 wt. % of a fat component, based on the total weight of the mixture.

Fat may be present in the mixture of edible ingredients as defined herein in relatively low amounts. Fat can be liquid fat or solid fat, preferably liquid fat, at ambient temperature, such as for example at 20° C. It can preferably be a fat selected from the group consisting of palm oil, sunflower oil, olive oil, rape seed oil and mixtures thereof. It can be a vegetable fat or an animal fat. Higher amounts are preferably prevented as they may interfere with the proper texture of the savoury article or may result in phase separation during storage or transport or in usage. Relatively high amounts of solid fat, such as e.g. saturated or hydrogenated fats may affect the desired texture, and therefore are not preferred. Relatively high amounts of liquid fat, such as for example oils which are liquid at room temperature, may have a weakening effect on the texture of the food article. Hence, preferably, the present invention relates to a mixture comprising less than 20 wt. % of fat, preferably less than 15 wt. %, more preferably less than 10 wt. %, even more preferably less than 5 wt. % of fat.

It is particularly preferred that the amount of solid fat at 20° C. is less than 10 wt. %, preferably less than 5 wt. %, even more preferably less than 1 wt. %, based on the total weight of the mixture.

The total fat, preferably present in an amount as indicated in the paragraph here above, preferably has a solid fat content at 20° C. (N20) of 0 to 10%, preferably 1 to 5%.

The mixture of edible ingredients in step a) has a temperature in the range of 10 to 80° C., preferably in the range of 8 to 70° C., more preferably in the range of 10 to 60° C.

Step b) according to the present invention relates to preparing a cooled mixture of edible ingredients by either the step of cooling and agitating the mixture of edible ingredients to provide a cooled mixture preferably having a temperature of −20 to 5° C., preferably −20 to 5° C. or by filling a mould with a mixture of edible ingredients and contacting the mould with a l liquid or gaseous refrigerant Preferably, the process comprises the step of cooling and agitating the mixture of edible ingredients provides a cooled, mixture preferably having a temperature in the range of −15 to 2° C., more preferably a temperature in the range of −10 to 1° C., most preferably a temperature in the range of −5 to 0° C.

Preferably, the temperature of the mixture of edible ingredients is cooled from a temperature in the range of 10° C. to 80° C. to a temperature in the range of −20 to 5° C. in less than 60 minutes, preferably less than 40 minutes, more preferably less than 30 minutes, even more preferably less than 20 minutes, most preferably less than 10 minutes.

Preferably, the temperature of the mixture of edible ingredients is cooled from a temperature in the range of 10° C. to 80° C. to a temperature in the range of −20 to 0° C. in less than 60 minutes, preferably less than 40 minutes, more preferably less than 30 minutes, even more preferably less than 20 minutes, most preferably less than 10 minutes The temperature of the cooled mixture of edible ingredients can, for example, be measured by temperature probe such as a RC-4H (Elitech, USA) temperature sensor with probe.

Typically, the temperature of the mixture of edible ingredients is cooled from a temperature in the range of 10° C. to 80° C. to a temperature in the range of −20 to 5° C., preferably in the range of −5 to 0° C., at a cooling rate in the range of 3-12° C./min, preferably, 10° C./min.

The step of "cooling and agitating" within the context of the present application means that the mixture of edible ingredients is cooled and simultaneously distributed within a cooling unit. In other words, the mixture of edible ingredients is cooled and simultaneously mixed. Agitating the mixture may be affected by the movement of a mixing blade(s) or by (an) other rotor(s), blade(s) or arm(s), which agitation means ensure the edible ingredients are agitated, i.e. mixed, during the cooling process.

Preferably, step b.i) is carried out in a continuous freezer. The continuous freezer may be operated in batch or continuous mode. The continuous freezer preferably has cooling means and agitation means. The continuous freezer may be a cooling unit equipped with a beater, a cooled, scrapped surface heat exchanger or a scraped surface freezer. A scraped surface heat exchanger (SSHE) or freezer (SSF) consists of scraper blades and beater assembly inside a cylinder. Scraper blades continuously scrape frozen matter from the cylinder wall, mixes it back to the mixture and carry it from one end of the freezer to the other end for the uniform cooling unloading.

Preferably, the cooled mixture is subjected to an extrusion step to provide a cooled and extruded mixture. Preferably the mixture of edible ingredients is cooled in a scraped surface heat exchanger and then the resulting product is fed into an extruder comprising an extruding screw, wherein the mechanical stress exerted by the extruder on the cooled product is from 10,000 to 25,000 Pa/m2, more preferably from 16,000 to 22,000 Pa/m2. Alternatively, the scraped surface heat exchanger also includes extrusion means. Preferably, the temperature at the extruder outlet is in the range of −20 to 5° C.

In another preferred embodiment, the process comprises the step of filling a mould with the mixture of edible ingredients and providing the mould with an elongate member, and contacting the mould with a liquid refrigerant to provide a frozen mixture, Preferably, the refrigerant is a liquid refrigerant The inventors have found that by freezing a mixture of edible ingredients in a mould by contacting the mould with a liquid refrigerant and then then freeze drying the frozen mixture, a food article is obtained that is attractive to the consumer, convenient to use, by virtue of the e.g. chopstick incorporated into the edible composition, and efficient to make in a high throughput process.

Without wishing to be bound by theory, the inventors postulate that freezing the mixture of ingredients by contacting a mould with a liquid refrigerant, the mixture freezes more quickly than in traditional freezing in a freezer, where air is the coolant. Due to the fast freezing, plant and/or meat matter is frozen before it has time to sink to the bottom of the mould, unlike in traditional freezing.

Surprisingly, the volume of the edible composition increases on freeze-drying more than an edible composition frozen in the standard way without agitation.

The liquid refrigerant is preferably a non-aqueous liquid and/or aqueous salt solution. The aqueous salt solution is preferably prepared from a salt selected from the group consisting of sodium $Na_2CO_3$, $NH_4NO_3$, $CaC_2H_3O_2$, $NH_4Cl$, $NaNO_3$, $Na_2S_2O_3$, $CaCl_2$), KCl, $NH_4SCN$, NaBr, $MgCL_2$, more preferably wherein the salt is selected from the group consisting of NaCl, KCl, Kl, $CaCl_2$), $MgCl_2$. Preferably, the salt is selected from the group consisting of NaCl, KCl, Kl, $CaCl_2$), $MgCl_2$.

Preferably, the salt is selected from the group consisting of NaCl, KCl, Kl, $CaCl_2$), $MgCl_2$ and used in the range of 1 to 30 g/L, more preferably 2 to 20 g/L. In some preferred embodiments, a supersaturated salt solution is used, for example more than 100 g of salt is dissolved in 1L water. Preferably, for a salt selected from the group consisting of NaCl, KCl, Kl, $CaCl_2$), $MgCl_2$ and mixtures thereof, a 15-25% aqueous solution is used (based on the weight of salt present in 100 g water).

The liquid refrigerant is preferably a non-aqueous liquid. The non-aqueous liquid is preferably a mixture of two or more of ethanol, methanol, propylene glycol, ethylene glycol and carbon dioxide. Preferably, the non-aqueous liquid is propylene glycol.

Preferably, the mould contacts the liquid refrigerant for a time in the range of 0.25 to 5 hours, preferably 0.5 to 3 hours, more preferably 1 to 2 hours.

Advantageously, the edible composition is removed from the mould after freezing. This means that the freeze-drying step can be carried out for a shorter period of time compared to a composition that is freeze dried in a container.

In another preferred embodiment, the process comprises the step of contacting the mould with a gaseous refrigerant. Preferably, the gaseous refrigerant is selected from the group consisting of air, oxygen, nitrogen, water vapour and mixtures thereof. In other words, the cold air present in a freezer contacts the mould and causes the mixture of edible ingredients to freeze.

Preferably, there is provided in a preferred embodiment, a process for the preparation of a savoury food article comprising the steps of:
 I. preparing a savoury composition comprising an edible salt, a fat component, plant matter and a starch component;
 II. placing an elongate member in the savoury composition;
 III. cooling the savoury composition and elongate member to a temperature below 0° C.,
 IV. freeze drying the frozen savoury composition and elongate member to provide a savoury food article,
  optionally step V wherein the savoury food article is packaged.

Preferably, in step I the savoury composition is prepared by mixing an edible salt, a fat component and plant matter, pasteurizing the resultant mixture, cooling the pasteurized mixture and mixing a starch component into the pasteurized mixture.

In step II the savoury composition is preferably present in a mould, preferably, wherein the savoury composition is removed from the mould after step II, III or IV, preferably after step III.

Preferably, the savoury composition is cooled to a temperature in the range of −40 to −5° C., preferably −30 to −10° C. in step III. The savoury composition is preferably cooled by flash freezing.

The freeze drying step IV preferably takes place for a time in the range of 5 to 24 hours, more preferably 10 to 22 hours.

In the process according to the invention, an elongate member is positioned in the cooled mixture. The elongate member is preferably composed of a solid material, for example wood, bamboo, plastic or metal, or an edible solid material such as starch. The elongate member preferably has at least two ends, wherein a first end is in contact with the savoury composition and a second end allows holding and/or stirring by the user. The term "solid material" means a material that is able to be grasped by the user. The solid material may be a tube, i.e. hollow, typical of a straw, or a massive solid material. Preferably, the elongate member is a stick, chopstick, utensil or straw.

In step c) the cooled mixture having an elongate member extending therefrom is freeze dried. The step of freeze drying comprises a freezing step, if necessary, and a drying step. The freezing step provides a solid, frozen mass of edible ingredients. In the subsequent drying step, water is evaporated from the frozen mass of edible ingredients. Typically, the drying step takes place for a time in the range of 5 to 72 hours, preferably 24 to 10 hours.

Preferably, step c) comprises a step of freezing the cooled mixture to less than 0° C. to obtain a frozen mixture prior to freeze drying.

Preferably, step c) comprises a step of flash freezing. Preferably, the flash freezing is carried out by contacting the mould containing the mixture of edible ingredients with a liquid refrigerant to provide a frozen, mixture having a temperature of −40 to 0° C.

The liquid refrigerant is preferably an aqueous salt solution, preferably said solution is prepared from a salt selected from the group consisting of sodium $Na_2CO_3$, $NH_4NO_3$, $CaC_2H_3O_2$, $NH_4Cl$, $NaNO_3$, $Na_2S_2O_3$, $CaCl_2$), KCl, $NH_4SCN$, NaBr, $MgCl_2$, more preferably wherein the salt is selected from the group consisting of NaCl, KCl, Kl, $CaCl_2$), $MgCl_2$.

Typically, the mould contacts the liquid refrigerant for a time in the range of 0.25 to 3 hours, preferably in the range of 0.3 to 2 hours, more preferably in the range of 0.5 to 1 hours.

Preferably, the present invention comprises step a1) heating the mixture of edible ingredients provided in step a) at a temperature of at least 60° C., more preferably at a temperature of at least 70° C., even more preferably at a temperature of at least 80° C., for at least 1 minutes. Preferably, the heating step a1) is carried out for at least 2 minutes, preferably at least 4 minutes.

The cooled mixture is placed into a mould. The mould may be any mould suitable for use with food ingredients, for example a plastic or silicon mould. Preferably a silicon mould is used. The mould may have straight, curved, grooved or embossed circumferential side walls. Typically, the mould is an inverted frustum of a cone, with a narrow bottom portion and a wide opening at an upper portion.

The processes of this invention preferably includes a step of homogenising and pasteurising the mix. The mix may be homogenised using equipment and conditions commonly known in the industry for example a single stage valve homogeniser or an ultra high pressure (UHP) homogeniser. Pasteurisation of the homogenised mix can be conducted using any method and condition that is well known to a person skilled in this field for example high temperature short time (HTST) or low temperature long time (LTLT) pasteurisation. In a preferred homogenising and pasteurising step according to the processes of the present invention the temperature of the mixture of edible ingredients is raised to the pasteurisation temperature, the mixture is homogenised and then held at the pasteurisation temperature for sufficient time to complete the pasteurisation.

After homogenisation and pasteurisation the mixture is preferably held at a temperature between about 0° and about 6° C. for a period between about 1 and about 24 hours preferably with agitation. Preferably the product is held at a temperature between about 1° and about 5° C. with agitation for about 2 to about 18 hours, or more preferably for about 4 to about 12 hours Preferably, the freeze-dried food article is packaged in a hermitically sealed unit. The packaged food article is preferably contained in a wrapper. The wrapper may be any suitable food grade wrapper, for example a transparent, translucent or opaque packaging film. The packaging may contain one or more food articles. Preferably, a packaging unit comprises at least one, preferably at least two food articles as defined herein.

The savoury article as defined herein is preferably packaged. The present invention therefore relates in an aspect to a packaged savoury food article consisting of a solid, savoury composition having an elongate member extending therefrom, wherein the savoury composition comprises, by total weight of the composition:
  a) 1 to 10 wt. % of an edible salt selected from sodium chloride, potassium chloride and combinations thereof;
  b) 1 to 10 wt. % of a fat component;
  c) 1 to 75 wt. %, preferably 40 to 75 wt. %, of plant matter selected from vegetables, herbs, spices and combinations thereof;
  d) 0 to 20 wt. % starch component;
  e) less than 5 wt. % water,
  wherein the sum of a) to e) constitutes at least 80 wt. % of the food composition.

The packaged savoury food article is preferably contained in a wrapper. The wrapper may be any suitable food grade wrapper, for example a transparent, translucent or opaque packaging film. The packaging may contain one or more savoury food articles. Preferably, a packaging unit comprises at least one, preferably at least two savoury food articles as defined herein.

In a preferred embodiment, there is provided a process for the preparation of a savoury food article comprising the steps of:
  I. preparing a savoury composition comprising an edible salt, a fat component, plant matter and a starch component;
  II. placing an elongate member in the savoury composition;
  III. cooling the savoury composition and elongate member to a temperature below 0° C.,
  IV. freeze drying the frozen savoury composition and elongate member to provide a savoury food article.

In a further preferred embodiment, there is provided a process for producing a food article consisting of an edible composition having an elongated member extending therefrom, the edible composition having a water content of less than 5 wt. %, by weight of the edible composition, said process comprising the steps of:
  a) providing a mixture of edible ingredients comprising,
    i) edible crystalline material selected from sodium chloride, potassium chloride, sucrose and combinations thereof;
    ii) plant matter selected from vegetables, fruit, herbs, spices and combinations thereof, iii) water, b) preparing a cooled mixture of edible ingredients by:

cooling and agitating the mixture of edible ingredients to provide a cooled, mixture having a temperature of −20 to 5° C., preferably-15 to 0° C., and positioning an elongate member in the cooled mixture, c) freeze-drying the cooled mixture having an elongate member extending therefrom to obtain a savoury food article.

In another preferred embodiment, there is provided a process for producing a food article consisting of an edible composition having an elongated member extending therefrom, the edible composition having a water content of less than 5 wt. %, by weight of the edible composition, said process comprising the steps of:

a) providing a mixture of edible ingredients comprising, i) edible crystalline material selected from sodium chloride, potassium chloride, sucrose and combinations thereof;

ii) plant matter selected from vegetables, fruit, herbs, spices and combinations thereof, iii) water, b) preparing a cooled mixture of edible ingredients by:

filling a mould with the mixture of edible ingredients and providing the mould with an elongate member, and contacting the mould with a liquid refrigerant to provide a frozen mixture, c) freeze-drying the cooled mixture having an elongate member extending therefrom to obtain a savoury food article.

Food Article

Preferably, the edible composition is a shaped edible composition. Typically, the shaped edible composition has a rectangular, cubic, ovoid, spherical, prism, tablet, lozenge shape.

The edible composition in contact with the elongate member is preferably present in an amount corresponding to an individual portion of a savoury or sweet meal or snack, for example a soup or broth. The savoury food article typically contains a savoury composition having a unit weight between 1 and 50 g, preferably between 2 and 25 g, more preferably between 3 and 22 g, and even preferably between 4 and 20 g, most preferably between 5 and 15 g.

Preferably, the edible composition has a hardness in the range of 15 to 50 kg, more preferably in the range of 17 to 45 kg, even more preferably in the range of 20 to 40 kg. The hardness can be measured using standard methods in the art, for example with a TAXT texture analyser.

Preferably, the edible composition has a density in the range of 0.12 to 0.8 g/cm$^3$, preferably, in the range of 0.15 to 0.5 g/cm$^3$ even more preferably in the range of 0.15 to 0.3 g g/cm$^3$.

The savoury article is preferably shape stable when shaken at 210 rpm for 2 hours at 20° C. It has been surprisingly found that the savoury article according to the invention does not crack, split or otherwise disintegrate, nor does the elongate member become detached, when the savoury article is subjected to a test simulating transport conditions. The term "shape stable" means that the savoury food article does not crack or disintegrate when shaken at 210 rpm for 2 hours at 20° C.

In a second aspect, there is provided a food article consisting of an edible composition having an elongate member extending therefrom, the edible composition comprising, by total weight of the composition:

a) 1 to 90 wt. % of an edible crystalline material selected from sodium chloride, potassium chloride, sucrose and combinations thereof;

b) 0 to 10 wt. % of a fat component;

c) 1 to 75 wt. % of plant matter selected from fruit, vegetables, herbs, spices and combinations thereof;

d) 0 to 90 wt. % starch component;

e) less than 5 wt. % water, wherein the sum of a) to d) constitutes at least 80 wt. % of the edible composition.

Amounts, preferred amounts, ingredients and preferred ingredients etcetera as specified for above apply also for the edible composition, mutatis mutandis, unless specified otherwise.

Preferably, the edible composition comprises 5-85 wt. %, more preferably 10-75 wt. %, even more preferably 15-65 wt. %, of the edible crystalline material, by weight of the edible composition.

Preferably the edible crystalline material is sodium chloride and/or potassium chloride.

Preferably, the edible composition comprises 0-35 wt. %, more preferably 1-25 wt. %, even more preferably 2-15 wt. %, of sodium chloride and/or potassium chloride, by weight of the edible composition.

Preferably, sodium chloride and/or potassium chloride comprises at least 80 wt. %, more preferably at least 90 wt. %, and at most 10 w. %, preferably at most 5 wt. % sucrose, of said edible crystalline material. Preferably, the sodium chloride and/or potassium chloride comprise at least 98 wt. % of said edible crystalline material.

Preferably the edible crystalline material is sucrose. Preferably, sucrose represents at least 80 wt. %, more preferably at least 90 wt. % and most preferably at least 98 wt. % of said edible crystalline material.

Preferably, the edible composition comprises 0-85 wt. %, more preferably 2-75 wt. %, even more preferably 5-65 wt. %, most preferably 10-55 wt. %, of sucrose, by weight of the mixture of the edible composition.

Savoury soups commonly contain plant pieces and a balance of edible crystalline materials such as sodium chloride and/or potassium chloride and sucrose. Typically, the edible composition preferably comprises 1-20 wt. %, more preferably 2-15 wt. %, most preferably 5-10 wt. % of sodium chloride and/or potassium chloride and 0-20 wt. % sucrose, more preferably 2-15 wt. % sucrose, by weight of the edible composition.

Sweet soups are popular in Asia and an example is white fungus soup. Typically, the edible composition preferably comprises 5-85 wt. %, more preferably 2-75 wt. %, even more preferably 5-65 wt. %, most preferably 10-55 wt. %, of sucrose, by weight of the edible composition, and 0-5 wt. %, more preferably 0.25-2 wt. % sodium chloride and/or potassium chloride, by weight of the edible composition.

Preferably, the edible composition is a shaped edible composition. Typically, the shaped edible composition has a rectangular, cubic, ovoid, spherical, prism, tablet, lozenge shape.

The edible composition in contact with the elongate member is preferably present in an amount corresponding to an individual portion of a savoury or sweet meal or snack, for example a soup or broth. The savoury food article typically contains a savoury composition having a unit weight between 1 and 50 g, preferably between 2 and 25 g, more preferably between 3 and 22 g, and even preferably between 4 and 20 g, most preferably between 5 and 15 g.

Preferably, the edible composition has a hardness in the range of 15 to 50 kg, more preferably in the range of 17 to 45 kg, even more preferably in the range of 20 to 40 kg. The hardness can be measured using standard methods in the art, for example with a TAXT texture analyser.

Preferably, the edible composition has a density in the range of 0.12 to 0.8 g/cm³, preferably, in the range of 0.15 to 0.5 g/cm³ even more preferably in the range of 0.15 to 0.3 g g/cm³.

The water content of the edible composition is less than 4.5 wt. %, even more preferably less than 3 wt. %, most preferably less than 2.5 wt. %.

Preferably, the edible composition 1-8 wt. % fat component. Preferably, the fat component has solid fat content (N20) of less than 10% at 20° C., preferably less than 5% at 20° C.

In a preferred embodiment, the food article comprises a sweet edible composition comprising:
a) 30 to 70 wt. % of an edible crystalline material comprising 1-10 wt. % sodium and/or potassium chloride and 90-99 wt. % sucrose, by weight of crystalline material,
b) 0 to 10 wt. % of a fat component;
c) 40 to 75 wt. % of plant matter selected from fruit, vegetables, herbs, spices and combinations thereof;
d) 20 to 80 wt. % binder component;
e) less than 5 wt. % water,
preferably wherein the edible composition has a hardness in the range of 15 to 50 kg.

In another preferred embodiment, the food article comprises a savoury edible composition comprising:
a) 10 to 50 wt. % of an edible crystalline material comprising 50-90 wt. % sodium and/or potassium chloride and 10-50 wt. % sucrose, by weight of crystalline material,
b) 0 to 10 wt. % of a fat component;
c) 1 to 75 wt. % of plant matter selected from fruit, vegetables, herbs, spices and combinations thereof;
d) 40 to 80 wt. % binder component;
e) less than 5 wt. % water,
preferably wherein the edible composition has a hardness in the range of 15 to 50 kg.

Preferably, the savoury food article consisting of a solid, savoury composition having an elongate member extending therefrom, wherein the savoury composition comprises, by total weight of the composition:
a) 1 to 10 wt. % of an edible salt selected from sodium chloride, potassium chloride and combinations thereof;
b) 1 to 10 wt. % of a fat component;
c) 40 to 75 wt. % of plant matter selected from vegetables, herbs, spices and combinations thereof;
d) 0 to 20 wt. % starch component;
e) less than 5 wt. % water,
wherein the sum of a) to d) constitutes at least 80 wt. % of the food composition Preferably, the savoury food article consists of a solid, savoury composition having an elongate member extending therefrom, wherein the savoury composition comprises, by total weight of the composition:
a) 2 to 5 wt. % of an edible salt selected from sodium chloride, potassium chloride and combinations thereof;
b) 1 to 5 wt. % of a fat component;
c) 50 to 75 wt. % of plant matter selected from vegetables, herbs, spices and combinations thereof;
d) 0 to 20 wt. % starch component;
e) less than 5 wt. % water,
wherein the sum of a) to d) constitutes at least 80 wt. % of the food composition.

Preferably, the savoury food article consists of a solid, savoury composition having an elongate member extending therefrom, wherein the savoury composition comprises, by total weight of the composition:
a) 1 to 5 wt. % of an edible salt selected from sodium chloride, potassium chloride and combinations thereof;
b) 1 to 5 wt. % of a fat component;
c) 40 to 75 wt. % of plant matter selected from vegetables, herbs, spices and combinations thereof;
d) 5 to 15 wt. % starch component;
e) less than 5 wt. % water,
wherein the sum of a) to d) constitutes at least 80 wt. % of the food composition.

In a third aspect, the present invention relates to a food article obtainable by a process as described herein.

In a fourth aspect, the present invention relates to the use of a food article as defined herein for preparing a savoury dish, preferably a soup.

In another aspect, the present invention relates to a method for preparing a savoury meal comprising contacting a food article as defined herein with water having a temperature of at least 80° C.

EXAMPLES

Example 1

Edible compositions were prepared using the recipe in table 1. Sample 1 is a miso type base and sample 2 is a sweet type base (for e.g. white fungus soup).

TABLE 1

| Ingredient | 1 | 2 |
| --- | --- | --- |
|  | Parts by weight | |
| Salt | 2 | 0 |
| Sugar | 1 | 15.7 |
| Vegetable (particle size > 3 mm) | 50 | 50 |
| Water | 30 | 25 |

Briefly, a soup composition was prepared by the ingredients listed in Table 1. The composition, the mix was heated up to 80° C. The mix was pasteurized for minimum 2 minutes at 70° C. (gives a 6 log reduction of vegetative pathogenic organisms; z value=7.5° C.). The mix was cooled down to a target temperature of 56° C. (min. 51° C., max. 58° C.). When the mixture reached 56° C., the remaining starch was added and mixed in homogeneously.

Sample 1 was added at temperature of 50° C. via a hopper to a continuous Freezer: Taylor 104-40 fitted with an agitator 1.0 HP, ran at an agitator speed 180 rpm=1.27 m/s, agitator diameter 135 mm and equipped with a cooling system 2500 BTU/hr.

The cooled mixture (−2° C.) was filled into flexible silicone moulds. A wooden spoon or stick was fixed with the hole provided at the bottom of the mould. Silicone ice moulds with a filling volume of 90 ml (per individual lollipop) were used; 70-80 g were filled for each lollipop.

The moulds with the concentrate were put into a freezer (−40° C.) were kept at that temperature until completely frozen. The food articles were taken out of the moulds and then transferred to a Freeze Dryer: Labconco Freeze Dryer operated at −45° C. and <130 bar, time: approx. 36-48 hours.

The lollipops are taken out of the forms and were hermetically packed.

The process was repeated with Sample 2.

Comparative Example A—Conventional Freezing/Freeze-Drying

Sample 1 was filled into flexible silicone moulds. A wooden spoon or stick was fixed with the hole provided at the bottom of the mould. Silicone ice moulds with a filling volume of 90 ml (per individual lollipop) were used; 70-80 g were filled for each lollipop.

The moulds with the concentrate were put into a freezer (−40° C.) were kept at that temperature until completely frozen.

The water content of the freeze dried savoury article was 1.9%, by weight of the total composition.

The deep-frozen lollipops were put into a freeze dryer to provide a dry soup composition.

The freezing time was the time to freeze from 25° C. to 0° C.: 1 and 2 less than 10 minutes.

Sample A took 50 minutes.

The properties of the products of 1, 2 and A were analyzed by visually and by electron microscopy. For electron microscopy samples were pre-treated with ion sputter by using machine HitachiE1045, and scan samples by electron microscopy of type Hitachi TM 3000.

Hardness was measured using a TAXTplus Texture Analyser using a 5 mm diameter probe. The sample was measured using the compression test mode, pre-test speed of 1.00 mm/see, test speed of 2.00 mm/see, post test speed of 10.00 mm/sec. The distance was 5 mm. The trigger force was 5.0 g, the balance was 50 kg.

The dissolution of the dried composition-block (samples 1 and A) were measured by a dynamic conductivity measurement. A portion of 500 milliliter of demineralized water in a 600 milliliter beaker glass with a diameter of 12.7 cm is brought at a temperature of 92 C and one dried composition-block is dissolved under continuous stirring using a triangular stirring bar with a length of 8 cm at a constant stirring speed of 170 rpm. The conductivity of the water is monitored in time using a Mettler Toledo Seven Compact conductivity meter. The conductivity rises due to dissolution of the salts from the formulation into the water, until all salt is dissolved and a maximum is reached. The dissolution time is defined as the time at which the conductivity has reached 99% of the final plateau conductivity value

TABLE 2

| Sample | Density (kg/L) | Volume (cm$^3$) | Dissolution (s) | Hardness (Kg) | External Appearance | Internal Appearance |
|---|---|---|---|---|---|---|
| 1 | 226.3 | 68.76 | 186 | 10.71 | Whiter and smoother than A | Uniform pore size |
| 2 | 220.5 | — | — | — | Whiter and smoother than A | Uniform pore size |
| A | 276.7 | 51.66 | Incomplete after 240 | 22.62 | Rougher than 1 | Irregular pore size |

Example 2

TABLE 3

| Ingredient | 3 | 4 | 5 | 6 |
|---|---|---|---|---|
| | | Wt. % | | |
| Salt | 2.85 | 0 | 0 | 2.8 |
| Sugar | 2.85 | 13.8 | 13.8 | 2.8 |
| Binder | 14.2$^a$ | 2.5$^b$ | 2.5$^b$ | 2.85$^c$ |
| Vegetable (particle size > 3 mm) | 0 | 50 | 0 | 0 |
| Water | 80 | 33.8 | 83.8 | 91.4 |

$^a$ tapioca;
$^b$ ungelatinized potato starch;
$^c$ gelatin

TABLE 4

| Ingredient | B | C | D |
|---|---|---|---|
| | | Wt. % | |
| Salt | 2.8 | 0 | 0 |
| Sugar | 2.8 | 13.8 | 13.8 |
| Binder | 14.2$^a$ | 2.5$^b$ | 2.5$^c$ |
| Vegetal matter (White fungus/particle size > 3 mm) | 0 | 50 | 0 |
| Water | 80 | 33.8 | 83.8 |

$^a$ tapioca;
$^b$ ungelatinized potato starch;
$^c$ gelatin

Samples 3-6 were cooled with agitation prior to freeze-drying as per example 1 with the binder being added after heating in sample 5 and before heating in samples 3, 4 and 6.

The comparative examples B, C and D were prepared according to sample A, with the starch being added after heating in sample C and before heating in samples B and D Samples 3-6 provided food articles in which the edible composition was a solid, dry mass that retained its shaped after freeze drying.

Comparative samples B, C and D had a smaller volume than samples 3-5.

Example 3

Edible compositions were prepared using the recipe in table 5.

TABLE 5

| Ingredient | 7 wt. % | E wt. % |
|---|---|---|
| Salt | 2.9 | 2.9 |
| Sugar | 2.9 | 2.9 |
| Binder (tapioca[1]) | 14.3 | 14.3 |
| Water | 79.9 | 79.9 |

[1]Novation 3300 starch

Briefly, a soup composition was prepared by mixing water and powders (with a portion of the total amount of starch component) in a pot. The composition, the mix was heated up to 80° C. The mix was pasteurized for minimum 2 minutes at 70° C. (gives a 6 log reduction of vegetative pathogenic organisms; z value=7.5° C.). The mix was cooled down to a target temperature of 56° C. (min. 51° C., max. 58° C.). When the mixture reached 56° C., the remaining starch was added and mixed in homogeneously.

Sample 7 was filled into stainless steel moulds. A wooden spoon or stick was fixed with the hole provided at the bottom of the mould. Silicone ice moulds with a filling volume of 90 ml (per individual lollipop) were used; 70-80 g were filled for each lollipop The moulds were then placed in a calcium chloride bath for 20 minutes. The frozen moulds were then freeze dried. Freeze Dryer: Labconco Freeze Dryer operated at −45° C. and <130 millibar, time: approx. 24-72 hrs.

The lollipops are taken out of the forms and are instantly hermetically packed.

Comparative Example E—Conventional Freezing/Freeze-Drying

Sample 7 was filled into flexible silicone moulds. A wooden spoon or stick was fixed with the hole provided at the bottom of the mould. Silicone ice moulds with a filling volume of 90 ml (per individual lollipop) were used; 70-80 g were filled for each lollipop, The moulds with the concentrate were put into a freezer (−40° C.) were kept at that temperature until completely frozen.

The water content of the freeze dried savoury article was 1.9%, by weight of the total composition.

The deep-frozen lollipops were put into a freeze dryer to provide a dry soup composition.

The properties of the products of example 7 and example E were analyzed. For electron microscopy samples were pre-treated with ion sputter by using machine HitachiE1045, and scan samples by electron microscopy of type Hitachi TM 3000.

Hardness was measured using a TAXTplus Texture Analyser using a 5 mm diameter probe. The sample was measured using the compression test mode, pre-test speed of 1.00 mm/sec, test speed of 2.00 mm/sec, post test speed of 10.00 mm/sec. The distance was 5 mm. The trigger force was 5.0 g, the balance was 50 kg.

TABLE 6

| Sample | Density (kg/L) | Hardness (kg) | Distribution of plant matter | Cooling time: from 50° C. to 0° C./minutes | Freezing time: from 0° C. to −20° C. |
|---|---|---|---|---|---|
| 7 | 213.1 | 29.15 | Evenly distributed throughout the block | 7 | 13 |
| E | 277.0 | 10.71 | Settled at bottom of block | 40 | 200 |

Example 4

A savoury composition was prepared using the recipe in table 7. A comparative savoury composition (F) was also prepared.

TABLE 7

| Ingredient | 8 Wt. % | F Wt. % |
|---|---|---|
| Salt | 0.85 | 5.1 |
| Sugar | 1.6 | 6.2 |
| Vegetable powder[1] & herbs | 11 | 23 |
| Yeast | 1.5 | 0 |
| Fat component | 2.7 | 34 |
| Water | 77 | 0 |
| Native Potato starch | 2.11 | 10.4 |
| wheat flour | 0 | 20.4 |

Briefly, a soup composition was prepared by mixing water and powders (with a portion of the total amount of starch component) in a pot. The composition, the mix was heated up to 80° C. The mix was pasteurized for minimum 2 minutes at 70° C. (gives a 6 log reduction of vegetative pathogenic organisms; z value=7.5° C.). The mix was cooled down to a target temperature of 56° C. (min. 51° C., max. 58° C.). When the mixture reached 56° C., the remaining starch was added and mixed in homogeneously.

The composition (shown in Table 7) was filled into flexible silicone moulds. A wooden spoon or stick was fixed with the hole provided at the bottom of the mould. Silicone ice moulds with a filling volume of 90 ml (per individual lollipop) were used; 70-80 g were filled for each lollipop The moulds with the concentrate were put into a freezer (−40° C.) were kept at that temperature until completely frozen.

The water content of the freeze dried savoury article was 1.9%, by weight of the total composition.

The deep-frozen lollipops were put into a freeze dryer to provide a dry soup composition.

Parameters Freeze Drying:
heating plates: 50° C.
cooling: −50° C.

vacuum: 1.00 mbar
time: approx. 18-22 hrs.

The lollipops are taken out of the forms and are instantly hermetically packed.

Example 5

Transportation Test

Transport simulation involved placing the savoury article of samples F and 8 on a vibration table for 2 hours @ 210 rpm. This condition was being used for the transport test simulation within the EU.

TABLE 8

| | transport test | |
|---|---|---|
| Sample | Appearance before transport | Appearance after transport |
| F | Dry, solid block; | packaging stained by fat |
| 8 | Solid article with appealing appearance | Solid article with appealing appearance |

Example 6

Drop Test

The savoury food article of sample 8 was used. The article was dropped from a height of decided for 130 cm, to simulate the situation when a soup lolly is accidently dropped from a supermarket shelf.

TABLE 9

| | drop test | |
|---|---|---|
| Sample | Appearance before drop | Appearance after drop |
| 8 | Solid article with appealing appearance | Solid article with appealing appearance - no cracking or splitting |

Example 7

The savoury article of sample 8 was removed from the packaging and placed in a mug. Water was boiled in a kettle. The required amount of water (approx. 200 ml) was measured into a measuring cup, and from there transferred into the mug. The savoury food article was held by the stick and stirred until dissolved. The test was repeated with comparative sample F.

TABLE 10

| | dissolution test | |
|---|---|---|
| Sample | Dissolving time | Appearance |
| 8 | 30 sec | No fat eyes |
| F | 99 sec | Fat eyes |

The invention claimed is:

1. A process for producing a food article consisting of an edible composition having an elongated member extending therefrom, the edible composition having a water content of less than 5 wt. %, said process comprising the steps of:
 a) providing a mixture of edible ingredients comprising,
  i) edible crystalline material selected from sodium chloride, potassium chloride, sucrose and combinations thereof;
  ii) plant matter selected from vegetables, fruit, herbs, spices and combinations thereof;
  iii) water,
 a1) heating the mixture of edible ingredients provided in step a) at a temperature of at least 60° C. for at least 1 minute; and adding ungelatinized starch after the mixture of edible ingredients has been heated to at least at a temperature of at least 60° C. for at least 1 minute;
 b) cooling the mixture of edible ingredients by:
  i) cooling and agitating the mixture of edible ingredients to provide a cooled mixture having a temperature of −20 to 5° C. and positioning an elongate member in the cooled mixture, or
  ii) filling a mould with the mixture of edible ingredients and providing the mould with an elongate member, and contacting the mould with a liquid or gaseous refrigerant to provide a frozen mixture, and
 c) freeze-drying the cooled mixture of step i) or ii) having an elongate member extending therefrom to obtain a food article.

2. The process according to claim 1, wherein step b.i) is carried out in a continuous freezer.

3. The process according to claim 1, wherein step bi) comprises placing the cooled mixture into a mould.

4. The process according to claim 1, wherein the liquid refrigerant is an aqueous salt solution and/or a non-aqueous liquid.

5. The process according to claim 1, wherein the elongate member is a made of an inedible material.

6. The process according to claim 1, comprising the step of packaging the food article.

7. The process according to claim 1, wherein the edible composition has a rectangular, cubic, ovoid, spherical, prism, tablet, lozenge shape.

8. A shaped food article obtained by a process according to claim 1, wherein the food article consists of an edible composition having an elongate member extending therefrom, the composition comprising, by total weight of the composition:
 a) 1 to 85 wt. % of an edible crystalline material selected from sodium chloride, potassium chloride and combinations thereof;
 b) 0 to 10 wt. % of a fat component;
 c) 1 to 75 wt. % of plant matter selected from fruit, vegetables, herbs, spices and combinations thereof;
 d) 2 to 20 wt. % binder component;
 e) less than 5 wt. % water,
 f) 0 to 20 wt. % meat matter,
wherein the sum of a) to d) constitutes at least 80 wt. % of the food composition.

9. The process according to claim 5, wherein the elongate member is a stick, chopstick, utensil or straw.

10. The process according to claim 7, wherein the edible composition is a shaped unit dose having a density in the range of 0.12 to 0.8 g/cm$^3$.

11. The food article according to claim 8, wherein the food article has a density in the range of 0.12 to 0.8 g/cm$^3$.

12. The food article according to claim 8, having a water content of less than 4.5 wt. %.

13. The food article according to claim 8, comprising 1-8 wt. % fat component.

14. The food article according to claim 8, wherein the edible composition has a hardness in the range of 15 to 50 kg.

* * * * *